April 19, 1966     H. J. HAGEMEYER, JR     3,247,237
PRODUCTION OF ACRYLONITRILE AND METHACRYLONITRILE
BY THE THERMAL CRACKING OF SATURATED NITRILES
Filed July 1, 1963

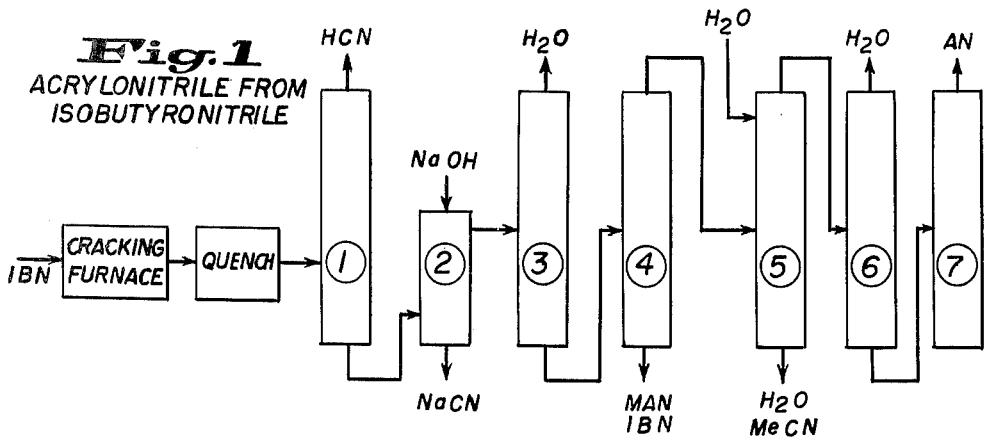

Fig. 1
ACRYLONITRILE FROM ISOBUTYRONITRILE

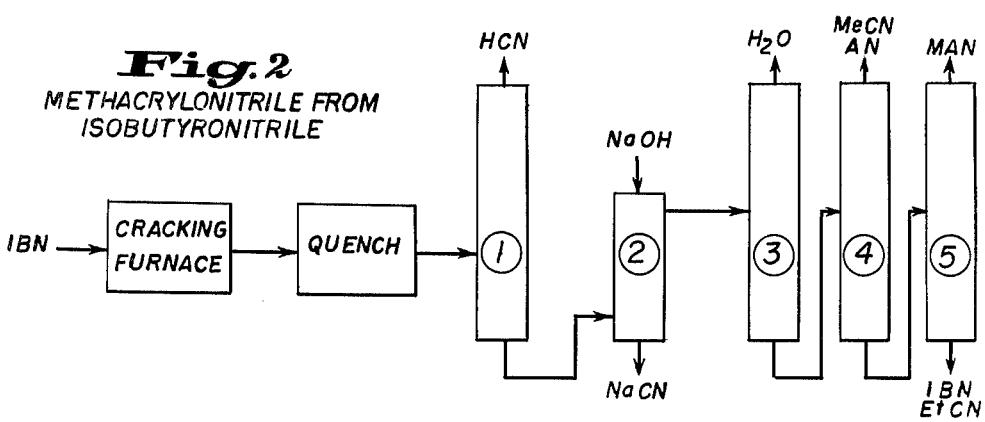

Fig. 2
METHACRYLONITRILE FROM ISOBUTYRONITRILE

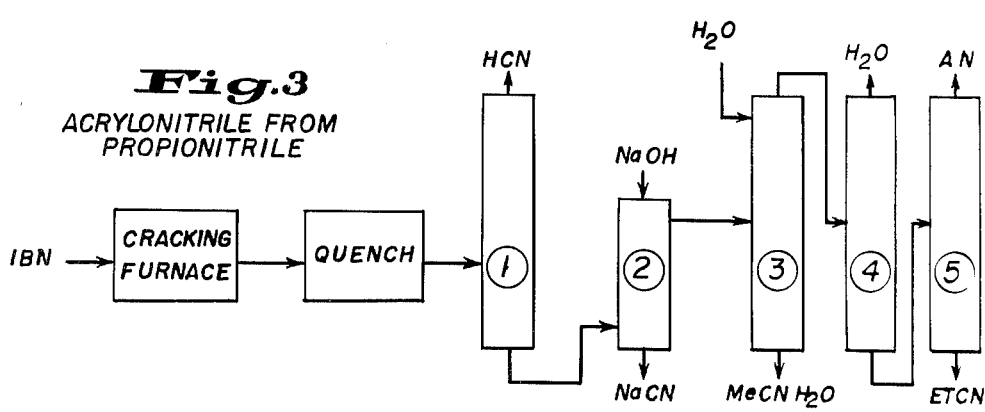

Fig. 3
ACRYLONITRILE FROM PROPIONITRILE

MAN = METHACRYLONITRILE
IBN = ISOBUTYRONITRILE
MaCN = ACETONITRILE
AN = ACRYLONITRILE
EtCN = ETHYL CYANIDE

Hugh J. Hagemeyer, Jr.
INVENTOR.

BY R. Frank Smith
Donald W. Spurrell
ATTORNEYS

United States Patent Office 3,247,237
Patented Apr. 19, 1966

3,247,237
PRODUCTION OF ACRYLONITRILE AND METHACRYLONITRILE BY THE THERMAL CRACKING OF SATURATED NITRILES
Hugh J. Hagemeyer, Jr., Longview, Tex., assignor to Eastman Kodak Company, Rochester, N.Y., a corporation of New Jersey
Filed July 1, 1963, Ser. No. 291,968
4 Claims. (Cl. 260—465.9)

This application is a continuation-in-part of my copending application Serial No. 58,152, filed September 26, 1960, now abandoned.

This invention relates to the production of unsaturated nitriles having an $\alpha,\beta$-olefinic linkage by an improved vapor phase, non-catalytic, straight thermal cracking of saturated nitriles, and more particularly, to the production of methacrylonitrile and acrylonitrile from isobutyronitrile, and the production of acrylonitrile from propionitrile by said thermal cracking.

It is known that saturated nitriles can be converted to unsaturated nitriles by straight thermal cracking. However, the yields of the unsaturated nitriles as compared to the amount of hydrogen cyanide, which is also formed, have heretofore been relatively low. This has been particularly true in the case of the lower aliphatic nitriles. For example, B. S. Rabinovitch and C. A. Winkler, Canadian Journal of Research, vol. 20, pages 69–72 (1942), found that upon the pyrolysis of methyl and ethyl cyanides in a silica tube at temperatures of 865° C. and 675° C., respectively, hydrogen cyanide was produced as the principal product, e.g. 0.42 moles of HCN per mole of ethyl cyanide pyrolyzed, along with the formation of lesser amounts of acetronitrile (0.27 mole) and acrylonitrile (0.24 mole) or equivalent to roughly equal amounts on a weight basis. This calculates to a weight ratio of acrylonitrile/hydrogen cyanide of approximately 1.1. A generally similar result was found by Spence et al., U.S. Patent No. 2,385,552, dated September 25, 1945, wherein it was indicated that it is possible to dehydrogenate saturated nitriles to a limited extent, at temperatures above 600° C., in the absence of a catalyst, but the yields are low. Also, such an uncatalyzed reaction is accompanied by objectionable side reactions. Further, the lower temperatures favor the dehydrogenation reaction while higher temperatures favor the splitting out of hydrogen cyanide. This is illustrated by Spence et al. in their Examples 11 and 12 wherein at 700° C. and a space velocity of 402 isobutyronitrile is shown to give a yield of 30% of methacrylonitrile, 24% of acrylonitrile and 26% of hydrogen cyanide, while at 750° C. and a space velocity of 380, isobutyronitrile is shown to give a yield of 11% of methacrylonitrile, 20% of acrylonitrile and 24% of hydrogen cyanide, the values in each example being based on the amount of isobutyronitrile which was decomposed. The weight ratio of cyanoalkene produced (methacrylonitrile+acrylonitrile) to hydrogen cyanide calculates to be approximately 2.1 for Example 11 and 1.3 for Example 12. These prior art results indicate that it is not commercially feasible or practical to prepare lower unsaturated nitriles by straight cracking of lower saturated nitriles. Furthermore, both of the above-mentioned processes show disadvantageous carbon deposition on the reactor walls and on the catalyst.

I have now found that lower saturated aliphatic nitriles containing from 3–5 carbon atoms, and more particularly isobutyronitrile and propionitrile, can be converted in continuous manner to unsaturated nitriles with a minimum of by-products such as hydrogen cyanide by straight, non-catalytic thermal cracking of the saturated nitrile at 550–750° C., under certain conditions of space and linear velocities, and that the conversion can be carried out efficiently with little or no coking or deposition of carbon on the reactor walls. For example, in the conversion of isobutyronitrile, the products are obtained in the form of a mixture comprising by weight about from 30–40% of acrylonitrile, about from 40–60% of methacrylonitrile and only about from 10–20% of hydrogen cyanide. This highly advantageous result of relatively high unsaturated nitrile content and low hydrogen cyanide content is based on my discovery that the linear velocity is critical for obtaining yields of 90% or more at commercially acceptable conversions. Thus, in accordance with the invention, when linear velocities of from 75–400 feet per second are used, space velocities in the range of 1500–7000 (contact times of 2.4 to 0.51 seconds) can be employed to give an excellent nitrogen balance to useful products with a favorable cyanoalkene to hydrogen cyanide (HCN) weight ratio. For isobutyronitrile, this weight ratio is about from 4.0–8.0, while for propionitrile it is about 3.0 of cyanoalkene to HCN. In contrast to the above, I have found further that when the conversion of isobutyronitrile and propionitrile is carried out at less than 75 feet per second with space velocities of from about 500–3100, the products obtained show a cyanoalkene to HCN weight ratio of only from about 1.4–2.4. Weight ratios of this order are also shown by the aforementioned prior art processes. Furthermore, the process of the invention results in conversions per pass of more than double that obtained with linear velocities of less than 75 feet per second. Examples 4–6 and 9 illustrate the point that at the lower linear velocities poor cyanoalkene to HCN weight ratios are obtained regardless of the space velocity.

Since the term "linear velocity" as employed herein is defined as the cubic feet of gas per second divided by the cross sectional area in square feet, and the term "space velocity" is defined as the volume of gas per hour divided by the reactor volume, it will be clear that the length to diameter ratios of the reactor must be so chosen that the linear and space velocities will come within the requirements of the invention. It is noted that the gas referred to in this paragraph is the aliphatic nitrile which is fed to the reactor as a liquid and immediately vaporizes therein. Its volume is calculated at the temperature and pressure prevailing in the reactor at operating conditions.

It is, therefore, an object of the invention to provide a greatly improved non-catalytic, straight thermal cracking process for converting lower aliphatic saturated nitriles containing from 3–5 carbon atoms to unsaturated nitriles, and more especially the conversion of isobutyronitrile to acrylonitrile and methacrylonitrile, and the conversion of propionitrile to acrylonitrile as the chief products. Another object is to thermally crack isobutyronitrile and propionitrile in such a manner that the weight ratio of cyanoalkene/hydrogen cyanide is considerably greater than that obtained by prior art processes.

These and other objects will become apparent hereinafter through the following description and drawings comprising FIGS. I, II, and III showing respectively the production of pure acrylonitrile, methacrylonitrile and acrylonitrile.

In accordance with the invention, these objects are attained by continuously passing a dry vaporized, aliphatic saturated nitrile containing from 3–5 carbon atoms, in the absence of air and catalyst, through a reactor space, preferably a straight tubular reactor, heated at 550–750° C., at a space velocity of from 1500–7000 but preferably from 1500–3600, and a linear velocity of from 75–400 but preferably from 90–200 feet per second. For example, when linear velocities in the range of 100 feet per second or greater are used, space velocities of 1500–3600 or contact times of 2.4 to 0.51 seconds are employed to give outstanding results. In the examples described hereinafter, the highest linear velocity employed is 172 feet per second (Example 10). This limitation was imposed by the pressure drop through 215 feet of one-inch pipe at the 4790 pounds per day feed rate. However, in a commercial plant and using 3 or 4-inch diameter tubes higher linear velocities can be maintained for a given pressure drop, for example, linear velocities up to about 400 feet per second. Packed reactors containing suitable non-catalytic, inert refractory materials can also be used. However, optimum results are obtained using either horizontal or vertical unpacked tubular reactors. It is noted that passing the gas through a catalyst bed at such high velocities would practically eliminate the utility of such catalyst since catalytic action requires an intimate contact of the catalyst and gas molecules for an appreciable period of time. The use of such catalysts, therefore, in applicant's process is deemed superfluous.

The formation of methacrylonitrile, acrylonitrile and hydrogen cyanide by the non-catalytic, thermal cracking of isobutyronitrile may be illustrated by the following reaction equations:

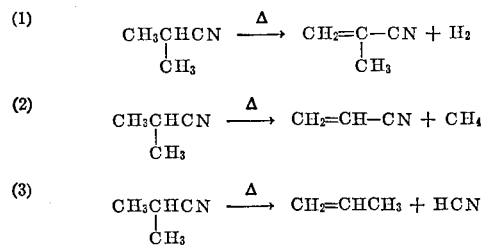

Under the reaction conditions of the invention, the processes of above Equations 1 and 2 are favored to yield the products in the previously mentioned weight ratio of cyanoalkenes/hydrogen cyanide of 4.0–8.0, or as previously stated in the proportions of 30–40% by weight of acrylonitrile, 40–60% by weight of methacrylonitrile and from 10–20% by weight of hydrogen cyanide.

The cracked products issuing from the reactor also contain some saturated nitriles, e.g., residual unreacted starting saturated nitrile, but the components are all easily separated by distillation and recovered in highly pure states. This is in marked contrast to the rather complex mixtures formed in both the known dehydrogenation and selective oxidation processes. For example, in the selective oxidation processes, the product in addition to containing the saturated nitrile, unsaturated nitrile and hydrogen cyanide also contains water, amides, free acids, ammonium salts, cyanogen polymers and basic nitrogenous compounds. The very nature of the mixture formed in the selective oxidation process results in considerable addition of hydrogen cyanide to the double bond with a resultant loss in yield of the desired vinyl monomers. In the case of the catalystic dehydrogenation processes, complications are introduced by over dehydrogenation which results in the formation of acetylenic nitriles, cyanogen polymers and in the low yields of product per unit of catalyst destroyed over deactivated.

The following examples will serve further to illustrate the process of the invention.

EXAMPLE 1

A 1,000-pound per day pilot plant was operated for the production of acrylonitrile and methacrylonitrile by the thermal cracking of isobutyronitrile at 675° C. and one second contact time. The pyrolysis tube was fabricated from one-inch stainless steel and was 215 feet long. Isobutyronitrile was vaporized and fed downward through a 20 ft. straight section of the tube. The remainder of the flow took place upward through 195 feet of coiled tubing, coiled around the straight section in a 10-inch radius. No catalyst or packing was used. The cracked products were led to a close coupled scrubber and scrubbed at 10–15° C. with the crude liquid products. The crude product scrubber overflows continuously to the distillation section and acrylonitrile, methacrylonitrile and hydrocyanic acid are separated into pure streams of fractionation.

Typical operation of the nitrile plant for a 24-hour period is shown below:

Operating conditions:
    Reactor temperature, ° C. _____ 677
    Furnace temperature, ° C. _____ 739
    Isobutyronitrile (IBN) feed rate, lbs./day ___ 4153
    Contact time, seconds _____ 1.0
    Space velocity, vol./hr. _____ 3600
    Linear velocity, ft./sec. _____ 125
    Off gas to flare, SCFD [1] _____ 7948
    Isobutyronitrile used, lbs. _____ 1432
    Conversion, percent _____ 32
    Nitrogen yield, percent _____ 90.3
Materials produced:
    Acrylonitrile, lbs. _____ 324
    Methacrylonitrile, lbs. _____ 488
    Hydrogen cyanide, lbs. _____ 144
    Cyanoalkenes/HCN, weight ratio _____ 5.55

[1] Standard Cubic Feet/Day.

This represents a 32.0 percent conversion of isobutyronitrile to the above products and a 90.3 percent yield representing the combined yield of methacrylonitrile, acrylonitrile and hydrogen cyanide. The formation of 1–2 percent of acetonitrile is not included in this yield. The axact proportions of the the mentioned products calculates on a weight basis to 51.0% of methacrylonitrile, 33.9% of acrylonitrile and 15.1% of hydrogen cyanide.

EXAMPLE 2

The same furnace and pyrolysis tube and process described in Example 1 was employed, except the reaction was carried out at 691° C. and 1.3 seconds contact time for a 24-hour period:

Operating conditions:
    Reactor temperature, ° C. _____ 691
    Furance temperature, ° C. _____ 795
    Isobutyronitrile feed rate, lbs./day _____ 3980
    Contact time, seconds _____ 1.3
    Space velocity, vol./hr. _____ 2770
    Linear velocity, ft./sec. _____ 103
    Isobutyronitrile used, lbs. _____ 2013
    Conversion, percent _____ 50.2
    Nitrogen yield, percent _____ 96.4
Materials produced:
    Acrylonitrile, lbs. _____ 524
    Methacrylonitrile, lbs. _____ 566
    Hydrogen cyanide, lbs. _____ 215
    Cyanoalkene/HCN, weight ratio _____ 5.07

The conversion was 50.2 percent and the yield to the three coproducts was 96.4 percent. The exact proportions of the mentioned products calculates on a weight basis to 43.4% of methacrylonitrile, 40.3% of acrylonitrile and 16.3% of hydrogen cyanide.

EXAMPLE 3

The same unit and process described in Example 1 was used except the reaction was carried out at 590° C. using a 2-second contact time for 24 hours.

Operating conditions:
    Reactor temperature, ° C. _____ 590
    Furance temperature, ° C. _____ 700
    Isobutyronitrile feed rate, lbs./day _____ 2388
    Space velocity, vol./hr. _____ 1675
    Contact time, seconds _____ 2.0
    Isobutyronitrile used, lbs. _____ 810

Materials produced:
- Acrylonitrile, lbs. _____ 154
- Methacrylonitrile, lbs. _____ 232
- Hydrogen cyanide, lbs. _____ 75
- Cyanoalkene/HCN, weight ratio _____ 5.15

The conversion was 28.5 percent and the yield to the three coproducts was 84 percent. The exact proportions of the mentioned products calculates on a weight basis to 50.3% of methacrylonitrile, 33.4% of acrylonitrile and 16.3% of hydrogen cyanide.

EXAMPLES 4-5

These examples are for comparison purposes and illustrate the adverse results obtained by straight thermal cracking of isobutyronitrile in the specified preferred temperature range of 650°–700° C., but at a reduced space velocity.

The same unit and process described in Example 1 was used except the temperature in each example was 675° C. and the space velocities were 780 and 480 for Examples 4 and 5, respectively.

| Operating Conditions | Example 4 | Example 5 |
|---|---|---|
| Reactor Temperature, ° C | 675 | 675 |
| Furnace Temperature, ° C | 700 | 696 |
| IBN Feed Rate, lbs./day | 812 | 501 |
| Contact Time, seconds | 4.6 | 7.5 |
| Space Velocity, vol./hr | 780 | 480 |
| Linear Velocity, ft./sec | 43 | 27 |
| IBN Used, lbs | 640 | 472 |
| Conversion, Percent | 52.8 | 66.6 |
| Nitrogen Yield, Percent | 67.0 | 70.6 |
| Material Produced: | | |
| Acrylonitrile, lbs | 83 | 69 |
| Methacrylonitrile, lbs | 91 | 43 |
| Hydrogen Cyanide, lbs | 90 | 78 |
| Cyanoalkene/HCN, weight ratio | 1.93 | 1.43 |

The exact proportions of the products calculates on a weight basis to 34.5% of methacrylonitrile, 31.4% of acrylonitrile, 34.1% of hydrogen cyanide for Example 4 and 23.0% of methacrylonitrile, 36.5% of acrylonitrile and 40.5% of hydrogen cyanide for Example 5.

EXAMPLES 6-7

These examples illustrate the criticality of the linear velocity. For this purpose, the general procedure of Example 1 was employed with two reactors differing in length to diameter ratio but of equal volume. Example 6 was carried out with a reactor tube having an inside diameter (ID) of 2 inches and a length of 49 feet, while Example 7 was carried out with a reactor tube having an inside diameter of 1 inch and a length of 215 feet. With identical temperatures, feed rates of isobutyronitrile (IBN), space velocities and contact times but different linear velocities due to the different diameter/length ratios of the reactor tubes, the results clearly show the marked improvement obtained by the process of the invention (Example 7) carried out at a linear velocity of 143 feet per second as compared with the process carried out outside the invention (Example 6) at a linear velocity of only 33 feet per second.

| Operating Conditions | Example 6— Reactor Tube 2″ ID and 49′ long | Example 7— Reactor Tube 1″ ID and 215′ long |
|---|---|---|
| Reactor Temperature, ° C | 680 | 680 |
| IBN Feed Rate, lbs./day | 5,000 | 5,000 |
| Contact Time, seconds | 1.4 | 1.4 |
| Space Velocity, vol./hr | 2,570 | 2,570 |
| Linear Velocity, ft./sec | 33 | 143 |
| Conversion, Percent | 15.5 | 30.7 |
| Nitrogen Yield, Percent | 54.9 | 97.5 |
| Material Produced: | | |
| Acrylonitrile, lbs | 65 | 235 |
| Methacrylonitrile, lbs | 126 | 447 |
| Hydrogen Cyanide, lbs | 78 | 87 |
| Cyanoalkene/HCN Weight Ratio | 2.4 | 7.9 |

The calculated percentage values of materials produced give for Example 6 approximately 24% by weight of acrylonitrile, 47% by weight of methacrylonitrile and 29% by weight of hydrogen cyanide, while for Example 7 the corresponding values are 30.5%, 58.5% and 11%, respectively. This advantageous result shown by Example 7 is not the only in the relatively increased proportions of the unsaturated nitriles as compared with the hydrogen cyanide, but also in the absolute quantities of the products produced in any period of operation and represents approximately 3.6 times as much acrylonitrile, 3.5 times as much methacrylonitrile and only 1.1 times as much hydrogen cyanide as the quantities of these materials obtained in Example 6.

EXAMPLE 8

This example illustrates the effect of the use of lower temperatures in the process of the invention. In this case, gaseous isobutyronitrile was subjected to straight thermal-cracking at 652° C. using the same reactor and procedure of Example 1. The results indicate that while a lower linear velocity becomes allowable at the lower temperature, the proportion of hydrogen cyanide tends to increase.

Operating conditions:
- Reactor temperature, ° C. _____ 652
- IBN feed rate, lbs./day _____ 3386
- Contact time, seconds _____ 2.2
- Space velocity, vol./hr. _____ 1670
- Linear velocity, ft./sec. _____ 93
- Conversion, percent _____ 50.1
- Nitrogen yield, percent _____ 99.7

Materials produced:
- Acrylonitrile, lbs. _____ 325
- Methacrylonitrile, lbs. _____ 428
- Hhydrogen cyanide, lbs. _____ 198
- Cyanoalkene/HCN weight ratio _____ 3.9

The calculated percentage values of materials produced are approximately 34% by weight of acrylonitrile, 45% by weight of methacrylonitrile and 21% by weight of hydrogen cyanide.

EXAMPLES 9-10

These examples illustrate the criticality of the linear velocity in the thermal cracking of propionitrile to acrylonitrile and hydrogen cyanide. For this purpose, the general procedure of Example 1 was employed with two reactors differing in length to diameter ratio but of equal volume. Example 9 was carried out with a reactor tube 2″ ID x 49′ long, while Example 10 was carried out with a reactor tube 1″ ID x 215′ long. With identical temperatures, feed rates of propionitrile (EtCN), space velocities and contact times but different linear velocities due to the different diameter/length ratios of the reactor tubes, the results obtained show marked improvement by the process of the invention (Example 10) carried out at 172 feet per second as compared with the process carried out outside the invention (Example 9) at a linear velocity of only 39 feet per second.

| Operating Conditions | Example 9 | Example 10 |
|---|---|---|
| Reaction Temperature, ° C | 720 | 720 |
| EtCN Feed Rate, lbs./day | 4,790 | 4,790 |
| Contact Time, seconds | 1.2 | 1.2 |
| Space Velocity, vol./hr | 3,080 | 3,080 |
| Linear Velocity, ft./sec | 39 | 172 |
| Conversions, Percent | 11 | 28 |
| Nitrogen Yield, Percent | 64 | 96 |
| Reactor Dimensions | 2″ ID x 49′ long | 1″ ID x 215′ long |
| Material Produced: | | |
| Acrylonitrile, lbs | 143 | 808 |
| HCN, lbs | 91 | 273 |
| AN/HCN Weight Ratio | 1.57 | 2.96 |

The calculated percentage values of materials produced give for Example 9 approximately 61% by weight of acrylonitrile and 39% by weight of hydrogen cyanide, while for Example 10 the corresponding values are 75%, and 25%, respectively. This advantageous result for the process of Example 10 of the invention is also shown for the absolute quantities of acrylonitrile produced in the period of operation and represents an increase of approximately 5.7 times of acrylonitrile and only in increase of 3 times of hydrogen cyanide as compared with the quantities of these materials produced in Example 9. To the following descriptions of each process represented by flow sheets I, II and III will further illustrate the invention.

*Acrylonitrile from isobutyronitrile (FIG. 1)*

Dry IBN is cracked in a stainless steel tube, type 304, at 685–695° C. Contact time is 1.5–1.9 seconds and linear velocity of the vaporized feed is 125–250 ft./sec. in the cracking tube. The cracked product is quenched with chilled, cracked product as 40° C. The vapors are scrubbed with chilled, cracked product as 8–10° C. Quenched product is fed into the HCN stripper column (1) to remove all the HCN overhead. Material from the base of this column is washed with 5 percent aqueous NaOH (2) to remove residual HCN. Sodium isobutyrate, the preferred polymerization inhibitor, is added to the organic layer to provide a concentration of 100 p.p.m., and this mixture is fed to the drying column (3). The overhead material is continuously decanted to provide dry, crude product in the base of the column. The dry, crude product is then fed into the AN stripping column (4). Acrylonitrile and acetonitrile are distilled overhead. MAN and IBN overflow from the base of this column. Crude acrylonitrile is fed into an extractive distillation column (5). Water is introduced on the top tray to extract acetonitrile, and acrylonitrile is distilled overhead at the temperature for the AN-water azotrope. Wet acrylonitrile is then fed into the drying column (6). The overhead material is continuously decanted to provide dry AN in the base of the column. Dry AN from the base of the drying column is then fed into the acrylonitrile column (7) to provide a distilled product. Columns (4) and (7) are operated at reduced pressure, about 100 mm. Hg, to prevent thermally induced polymerization. The conversion of IBN to cracked products is 28–30 percent. Yields in mole percent are 17 percent to HCN, 5 percent to acetonitrile, 23 percent to acrylonitrile, 35 percent to methacrylonitrile, and 18 percent to propionitrile. IBN accountability averaged 97 percent. The propionitrile was recycled to produce additional acrylonitrile.

*Methacrylonitrile from isobutyronitrile (FIG. 2)*

Dry IBN is cracked in a stainless steel tube, type 304, at 660–680° C. Contact time is 1.5–1.9 seconds and linear velocity of the vaporized feed is 150–250 ft./sec. in the cracking tube. The cracked product is quenched with chilled product at 40° C., and the vapors from the quench are scrubbed with chilled product at 8–10° C. Quenched product is fed into the HCN stripper column (1) to distill all the HCN overhead. Material from the base of this column is washed (2) with 5 percent aqueous NaOH to remove residual HCN. Sodium isobutyrate, the preferred polymerization inhibitor, is added to the organic layer to provide a concentration of 100 p.p.m. The washed crude product is then fed into the drying column (3). The overhead material is continuously decanted to provide dry crude product in the base of the column. The dried material is next fed into the AN stripping column (4) where acrylonitrile and acetonitrile are distilled overhead. The base overflow is fed into the MAN column (5). MAN is distilled overhead. The base overflow, which contains isobutyronitrile and propionitrile, is recycled to the cracking furnace. Columns (4) and (5) are operated at reduced pressure, 100 mm. Hg to prevent thermally induced polymerization. The conversion of IBN to cracked products is 18–20 percent per pass. Yields in mole percent are 8 percent to HCN, 4 percent to acetonitrile, 21 percent to acrylonitrile, 54 percent to methacrylonitrile, and 11 percent to propionitrile. IBN accountability averaged 97 percent.

*Acrylonitrile from propionitrile (FIG. 3)*

Dry propionitrile is cracked in a stainless steel tube, type 304, at 700–710° C. Contact time is 0.9 to 1.1 seconds and linear velocity of the vaporized feed is 150–200 ft./sec. in the cracking tube. The cracked product is quenched with chilled, cracked product. Quench temperature is maintained at 35–40° C. Vapors from the quench are scrubbed with cracked product which has been chilled to 5–10° C. The quenched product is fed into the HCN stripper column (1) to remove all the HCN as an overhead product. Base product is washed (2) with 5 percent aqueous NaOH to remove residual HCN. Organic layer from the wash column (2) is fed into the extractive distillation column (3). Water is introduced onto the top plate to extract acetonitrile. Acrylonitrile and propionitrile are distilled overhead as the water azeotrope. The overhead product is decanted and the water layer is recycled to the top plate of the extractive distillation column (3). The organic layer is fed into the drying column (4). Sodium propionate, the preferred polymerization inhibitor, is added to the organic layer to maintain a concentration of 100 p.p.m. Overhead from the drying column (4) is continuously decanted to remove water. The organic layer is returned to the column as reflux. Dry nitriles from the base of this column are fed into the acrylonitrile column (5). This column is operated at reduced pressure, about 100 mm. Hg, to prevent thermally induced polymerization. Acrylonitrile is the overhead product. The base product, propionitrile, is recycled to the cracking furnace. The conversion of propionitrile to cracked products is 16–20 percent per pass. The yields in mole percents are 55 percent to acrylonitrile, 42 percent to HCN, and 2 percent to acetonitrile.

While the above examples have illustrated the process of the invention with just isobutyronitrile and propionitrile as the starting materials, it will be understood that the process is generally adapted to the thermal cracking of other saturated aliphatic nitriles of 3–5 carbon atoms, for example, butyronitrile, valeronitrile, etc., to give in general similar good yields of unsaturated nitriles with a minimum of by-products such as hydrogen cyanide.

The term "space velocity" as used in the preceding description and examples is defined as volume of isobutyronitrile vapor, calculated at actual operating temperature and pressure conditions, per reaction space per hour.

The invention has been described in detail with particular reference to preferred embodiments thereof but it will be understood that variations and modifications can be effected within the spirit and scope of the invention as described hereinabove and as defined in the appended claims.

What I claim is:

1. A continuous process comprising continuously feeding isobutyronitrile vapor into an essentially oxygen and catalyst-free reaction zone at a rate sufficient to maintain the hourly space velocity between 1500 and 7000, and the linear velocity between 75 and 400 feet per second, said reaction zone being sufficiently heated to maintain the gaseous contents thereof at between 550° C. and 750° C., whereby chemical decomposition of the isobutyronitrile to a mixture consisting primarily of acrylonitrile and methacrylonitrile is thermally induced.

2. The process of claim 1 wherein the hourly space velocity is from 1500–3600 and the linear velocity is from 90–200 feet per second.

3. A continuous process for producing acrylonitrile comprising passing propionitrile in vapor form through an essentially oxygen and catalyst-free reaction zone heated at 550–750° C., at an hourly space velocity of from 1500–7000 and a linear velocity of from 75–400 feet per second.

4. The process of claim 3 wherein the hourly space velocity is from 1500–3600 and the linear velocity is from 90–200 feet per second.

References Cited by the Examiner
UNITED STATES PATENTS 2,385,552  9/1945  Spence et al. _____ 260—465.9

OTHER REFERENCES

Rabinovitch et al.: Canadian Journal of Research; vol. 20, section B; May 1942, pages 69–72.

CHARLES B. PARKER, *Primary Examiner.*